United States Patent [19]

Leypold et al.

[11] Patent Number: 5,184,712

[45] Date of Patent: Feb. 9, 1993

[54] DEVICE FOR TRANSPORTING ARTICLES TO A CONVEYOR APPARATUS OF A PACKAGING MACHINE

[75] Inventors: Helmut Leypold, Ditzingen; Guenther-Eberhard Lade, Berglen-Bretzenacker, both of Fed. Rep. of Germany

[73] Assignee: Robert Bosch GmbH, Stuttgart, Fed. Rep. of Germany

[21] Appl. No.: 867,303

[22] Filed: Apr. 10, 1992

[30] Foreign Application Priority Data

Apr. 12, 1991 [DE] Fed. Rep. of Germany ....... 4111899

[51] Int. Cl.⁵ .............................................. B65G 47/12
[52] U.S. Cl. .................................... 198/449; 209/698; 198/360
[58] Field of Search ............... 198/360, 369, 449, 728, 198/731; 209/698, 707

[56] References Cited

U.S. PATENT DOCUMENTS 2,912,093 11/1959 Lauck ................................... 198/449
2,937,739 5/1960 Levy ............................... 209/698 X
4,854,440 8/1989 Laube et al. ........................ 198/357

Primary Examiner—D. Glenn Dayoan
Assistant Examiner—Cheryl L. Gastineau
Attorney, Agent, or Firm—Edwin E. Greigg; Ronald E. Greigg

[57] ABSTRACT

A device for transporting articles from a plurality of dispenser machines to a packaging machine including at least two delivery belts, a delivery device assigned to a furnishing device with furnishing places. Drivers that transfer the furnished articles to receiving cups of a conveyor apparatus of a packaging machine. For transferring the articles furnished to two furnishing places to the conveyor apparatus at a single transfer point, some of the drivers are disposed fixedly relative to the conveyor, and the others are disposed displaceably, transversely to the conveyor direction on the delivery device. The drivers are connected to bars, which extend transversely to a pair of conveyor chains. Stationary guide rails transmit the additional transverse motion to the displaceable drivers.

9 Claims, 1 Drawing Sheet

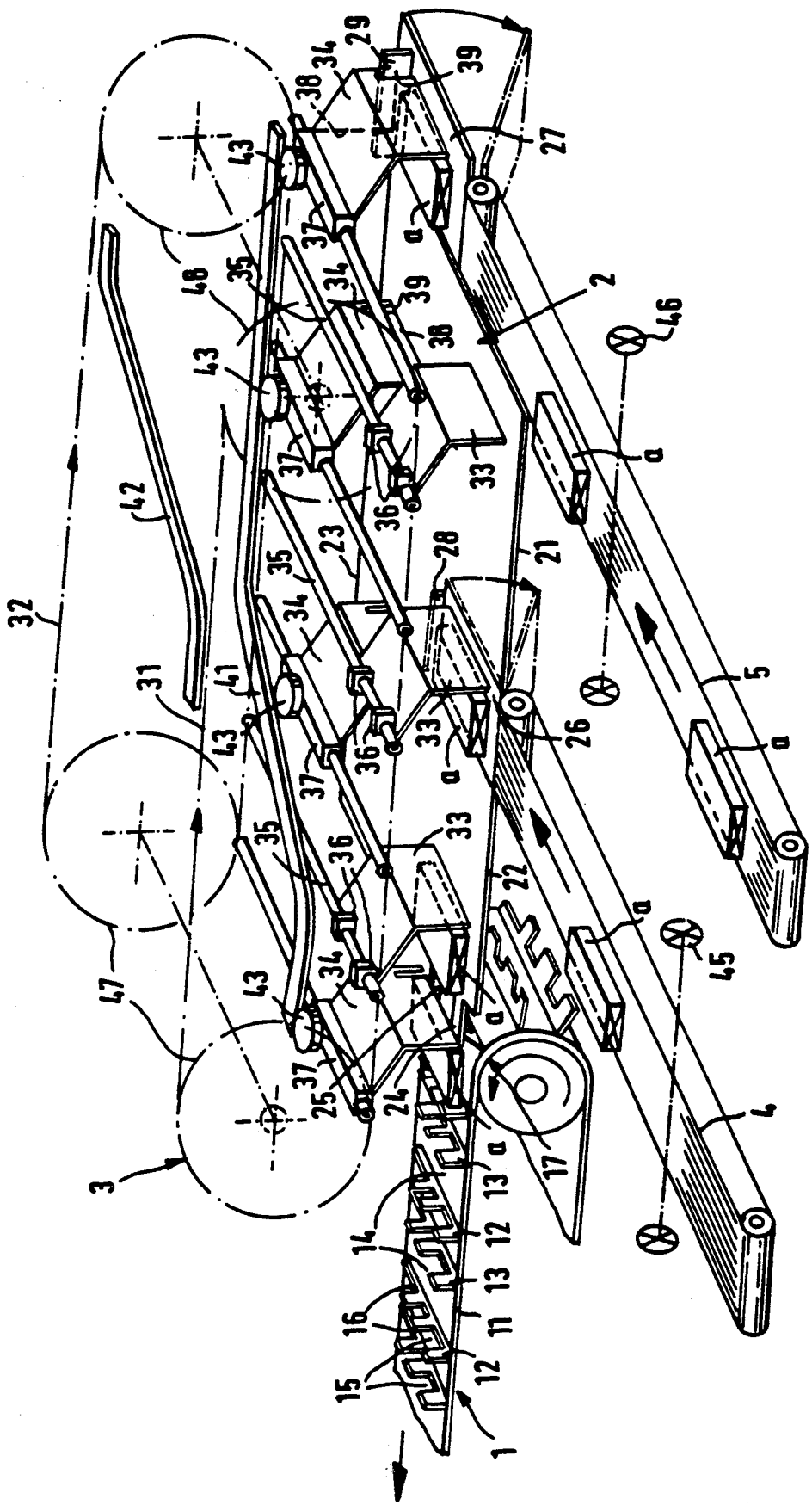

DEVICE FOR TRANSPORTING ARTICLES TO A CONVEYOR APPARATUS OF A PACKAGING MACHINE

BACKGROUND OF THE INVENTION

In a packaging system in which a plurality of production or dispenser machines, such as bagging or wrapping machines, supply a high-speed packaging machine, for instance a boxing machine, the capacity of which exceeds that of a single dispenser machine, the product conveyor apparatus of the packaging machine is assigned a plurality of furnishing devices, which furnish the articles that are to be packed and are delivered by the dispenser machines; the articles are then placed by transfer devices, by means of drivers into the receiving cups of the continuously-running product conveyor apparatus of the packaging machine. One such packaging system, known from U.S. Pat. No. 4,854,440, has four transfer devices, with one furnishing device assigned to each of them, and of which the same transfer device always supplies the identically disposed receiving cup of one group of four of the conveyor apparatus with an article. Also, in a packaging system (German Patent Application P 40 11 519.4) U.S. application Ser. No. 649,637, filed Feb. 1, 1991, two transfer devices each with two furnishing devices are provided, the drivers of which likewise introduce four furnished articles simultaneously, at four different points, into the product cups of the conveyor apparatus. In these known packaging systems, the conveyor apparatus of the packaging machine extends below all the transfer and furnishing devices, which are disposed one after the other, resulting in a considerable length. A single transfer device with two furnishing devices, however, is not suitable for supplying the receiving cups of the conveyor apparatus, which are disposed identically one after another, because the spacings of their drivers have to be greater than the spacing of the receiving cups of the conveyor apparatus. A simple device for transporting articles, with which articles supplied in a plurality of lines can be combined into one line and transferred, is therefore needed.

OBJECT AND SUMMARY OF THE INVENTION

The device for transporting articles according to the invention has an advantage that articles coming from a plurality of production or dispenser machines are transferred successively at a single point to the receiving cups of the conveyor apparatus of a packaging machine. This makes a short packaging machine conveyor apparatus possible. Moreover, the transfer device can be driven synchronously with the packaging machine, which contributes to the reliability and operating safety of the system.

Advantageous further developments of and improvements to the device disclosed are possible with the provisions set forth herein. A device with every other driver transversely displaceable on a transfer device is especially advantageous; it creates a direct connection between a twin dispenser machine and a packaging machine.

The invention will be better understood and further objects and advantages thereof will become more apparent from the ensuing detailed description of a preferred embodiment taken in conjunction with the drawing.

BRIEF DESCRIPTION OF THE DRAWING

The single figure of the drawing is a diagrammatic view, in which for the sake of simplicity some parts that appear repeatedly and are easily imagined are left out.

DESCRIPTION OF THE PREFERRED EMBODIMENT

For transporting articles a, for instance bags arriving from two tubular bag making machines, that are then to be introduced into a folding box, one furnishing device 2, one transfer device 3 and two delivery belts 4, 5 are disposed at the input end of a conveyor apparatus 1 of a boxing machine, not shown in further detail. The continuously driven conveyor apparatus 1 has pairs of drivers 12, 13, at equal intervals on endless chains 11; the drivers form receiving cups 14 for the articles a to be packed. The wall-shaped drivers 12, 13 have recesses 15, 16. At the level of the horizontal conveyor path of the conveyor apparatus 1, or somewhat above it, and aligned with it, its input end is adjoined in the region of a deflecting segment 17 by a horizontal, elongated flat surface 21 of the furnishing device 2. On its end toward the conveyor apparatus 1, the flat surface 21 has spaced teeth 24, 25, which mesh with the recesses 15, 16 of the drivers 12, 13 of the receiving cups 14 as they pass through the deflection segment. One long edge 22 of the flat surface 21, which extends on the side of the delivery belts 4, 5, extends in an extension of one long edge 22 of the conveyor apparatus 1, and another opposite long edge 23, parallel to the long edge 22, is spaced by at least the length of an article a with respect to the other long edge of the conveyor apparatus 1. The flat surface 21 is approximately twice as wide as the receiving cups 14 of the conveyor apparatus 1.

The two delivery belts 4, 5 which deliver the articles a from the dispenser machines may be driven either continuously or variably. The two delivery belts extend transversely to the flat surface 21, and delivers the articles toward the long edge 22, which is aligned with the long edge of the conveyor apparatus 1. One delivery belt 4 ends juxtaposed one long edge 22 approximately in the middle region of the flat surface 21, in front of a first furnishing place 26. The other delivery belt 5 moves the articles a along an end of the flat surface 21 to an end extension which is half the width of the flat surface 21 to deliver the articles a to a second furnishing place 27 in the end extension region of the flat surface 21. The two furnishing places 26 and 27 are disposed on the flat surface 21 offset both longitudinally and transversely to its longitudinal extension. The two furnishing places 26 and 27 are formed as vertically movable shelves which serve as traps that can open downward, so that any articles recognized as defective or delivered incorrectly can be rejected and dropped out at the bottom. In the delivery direction of the delivery belt 4, 5, one stop 28, 29 is disposed at each of the furnishing places 26, 27, and as the articles a are delivered they come to rest against these stops and are positioned there. For the positionally and chronologically correct transfer of the articles a placed at the furnishing places 26 and 27, the transfer device 3 is disposed above the flat surface 21. It has drivers 33, 34, in the form of bent plates, at equal intervals on a pair 31, 32 of conveyor chains. The endless conveyor chains 31, 32 are guided over pairs of deflection wheels 47, 48, of which one, 47, is disposed parallel above the axis of the deflection segment 17 of the conveyor apparatus 1, and the other is disposed above the furnishing place 27 assigned to the second delivery belt 5. They are driven synchronously with the conveyor apparatus 1.

The drivers 33, 34 are disposed on bars 35 that extend transversely between the two conveyor chains 31, 32 and are preferably spaced apart from one another by a distance that matches the spacing of the receiving cups 14 of the conveyor apparatus 1. Every other driver 33, belonging to a first group, is secured to the bars 35 by means of clamp elements 36 in such a way that these drivers 33 move over the flat surface 21 along a track that is in alignment with the conveyor path of the conveyor apparatus 1 and covers the first furnishing place 26; the drivers 34 disposed between them, belonging to a second group, are displaceably supported on their bars 35 with a sliding block 37, so that during their conveyor motion toward the conveyor apparatus 1, a transverse motion can additionally be superimposed upon them; the drivers 34 that sweep over the second furnishing place 27 on the end of the counter 21 remote from the conveyor apparatus 1 and running toward the track of the first group of drivers 33, are lined up along their conveyor path across the flat surface 21 from the offset track into the track of the first group of drivers 33. As a result, all the drivers 33, 34 on the output end of the conveyor apparatus 1 sweep past this same transfer point.

The transverse motion of the displaceable drivers 34 is generated, in the course of their conveyor motion, by a stationary, obliquely angled guide rail 41, on which rollers 43, connected to the sliding blocks 37, roll. With a guide rail 42 embodied in the opposite direction along the return path of the drivers, the displaceable drivers 34, after transferring the articles a, are pushed back into their offset track. The guide rails 41, 42 may also be embodied as slots. Thus the articles a from each of the furnishing places 26 and 27 are delivered alternately to the conveyor apparatus 1.

In order that the articles a, entrained by the transversely displaceable drivers 34, are also displaced transversely on the flat surface 21, these drivers 34, on their side remote from the drivers 33 of the first group, have a stop or side wall 38, which transmits the transverse motion to the entrained articles a. Near this side wall 38, they also have a vertical recess 39, with which the stop 29 at the furnishing place 27 meshes.

The transverse displacement path of the drivers 34 of the second group, o in other words the spacing between the two furnishing places 26, 27 transversely to the conveyor direction of the transfer device 3, amounts to at least the width of the drivers, or the length of the transferred articles a. Moreover, the spacing of the furnishing places 26, 27 in the conveying direction is an uneven spacing distance, for instance 3 or 5 times the spacing of the drivers 33, 34, so that the article a that is delivered on the offset furnishing place 27 from the delivery belt 5 crosswise of the track of the drivers 33 of the first group finds enough space between two successive drivers 33 of the first group, and so that all the receiving cups in the conveyor apparatus 1 can be occupied with gaps.

The apparatus described above functions as follows:

The articles a produced by the dispenser machines are brought to the furnishing places 26, 27 on the flat surface 21 by the delivery belts 4, 5. The correct position with respect to the phase of the transfer device 3 is monitored by photoelectric gates 45, 46; if the position is not correct in terms of phase, then the conveyor speed of the applicable delivery belt is adapted, or the trap of the furnishing place 26 or 27 is opened downward, so that any article not delivered at the correct phase is rejected. The delivered articles a are thrust onto the furnishing places 26, 27, where they are placed touching the stops 28 or 29 as applicable. The drivers 33 and 34 then shove the furnished articles a transversely to their conveying direction on the flat surface 21 to the conveyor apparatus 1; the article a guided by the driver 33 is transferred in a straight line, and the article a conveyed by the other driver 34 is transferred initially in a straight line, then obliquely, and finally in a straight line again, to the transfer point, and the article a that is initially received offset is lined up in its track between articles conveyed in a straight line. At the transfer point, where the drivers 12, 13 of the receiving cups 14 of the conveyor apparatus 1 mesh with the teeth 24, 25 of the flat surface 21, the articles a are pushed successively into the receiving cups 14 and carried by them to the packaging station.

The takeover of the articles a by the drivers at the furnishing places, and/or the transfer of the articles a to the receiving cups of the conveyor apparatus, can be still further improved if a pivoting motion toward or away from the article is transmitted to the drivers in these regions. This is attained by means of a pivotable displacement of the bars supporting the drivers and by means of stationary guide rails, by which levers connected to the bars are pivoted.

This is especially significant for the drivers 33, if they are intended to move away above the delivery belt 5.

In the above-described exemplary embodiment, transfer using two furnishing places and two groups of drivers is described. It is also possible within the scope of the invention for more than two groups of drivers to be arranged in more than two tracks, so that articles coming from more than two dispenser machines can be transferred into a single row. To this end, the drivers of one group should be disposed fixedly and those of the other groups disposed transversely displaceably on the delivery apparatus, with the displacement paths of the various groups being different.

Finally, it should also be noted that the delivery belts, which bring the articles from the various dispenser machines, may be disposed not only transversely to the conveying direction of the transfer device but also longitudinally thereof.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A device for transporting articles from a plurality of dispenser machines to uniformly spaced-apart receptacles of a continuously running conveyor apparatus of a packaging machine, having a plurality of delivery devices guiding the articles from the dispenser machines to separate furnishing places, an endless transfer device that transfers the articles from the separate furnishing places to the receptacles of the conveyor apparatus by means of drivers, said furnishing places (26, 27) are disposed on a common flat surface (21), extending in front of the conveyor apparatus (1), offset beside one another in the longitudinal direction of the flat surface, and that at least some of the drivers (33, 34) of the transfer device (3), which is aligned longitudinally of the flat surface (21), are displaceable transversely to the direction of travel of the transfer device and are guided in a plurality of paths beside one another in a region of the furnishing places (26, 27) and in a common path in front of the conveyor apparatus (1).

2. A device as defined by claim 1, in which every other driver (34) is disposed transversely displaceably on the transfer device (3).

3. A device as defined by claim 1, in which the transversely displaceable drivers (34) of the transfer device (3) are supported on bars (35) that extend transversely to endless conveyor chains (31, 32) of the transfer device.

4. A device as defined by claim 2, in which the transversely displaceable drivers (34) of the transfer device (3) are supported on bars (35) that extend transversely to endless conveyor chains (31, 32) of the transfer device.

5. A device as defined by claim 1, in which the transversely displaceable drivers (34) are moved transversely, during their conveyor motion with the conveyor device (3), by stationary guide rails (41, 42).

6. A device as defined by claim 2, in which the transversely displaceable drivers (34) are moved transversely, during their conveyor motion with the conveyor device (3), by stationary guide rails (41, 42).

7. A device as defined by claim 3, in which the transversely displaceable drivers (34) are moved transversely, during their conveyor motion with the conveyor device (3), by stationary guide rails (41, 42).

8. A device as defined by claim 4, in which the transversely displaceable drivers (34) are moved transversely, during their conveyor motion with the conveyor device (3), by stationary guide rails (41, 42).

9. A device as defined by claim 1 in which each of said furnishing places (26, 27) are operable vertically to drop out an undesired article a.

* * * * *